Jan. 7, 1936. A. F. MOYER ET AL Re. 19,812

BALANCING MACHINE

Original Filed May 2, 1924 4 Sheets-Sheet 1

Inventors:
Francis T. McDonough
Deceased.
By Precision Balancing
Machine Co., Assignee
Amos F. Moyer.

By
Paul Paul & Moore.
Attorneys.

Jan. 7, 1936. A. F. MOYER ET AL Re. 19,812

BALANCING MACHINE

Original Filed May 2, 1924 4 Sheets-Sheet 2

Inventors:
Francis T. McDonough, Deceased
By Precision Balancing Machine Co.
Assignee.
Amos F. Moyer.
By
Paul Paul & Moore
Attorneys.

Jan. 7, 1936. A. F. MOYER ET AL Re. 19,812
BALANCING MACHINE
Original Filed May 2, 1924 4 Sheets-Sheet 3
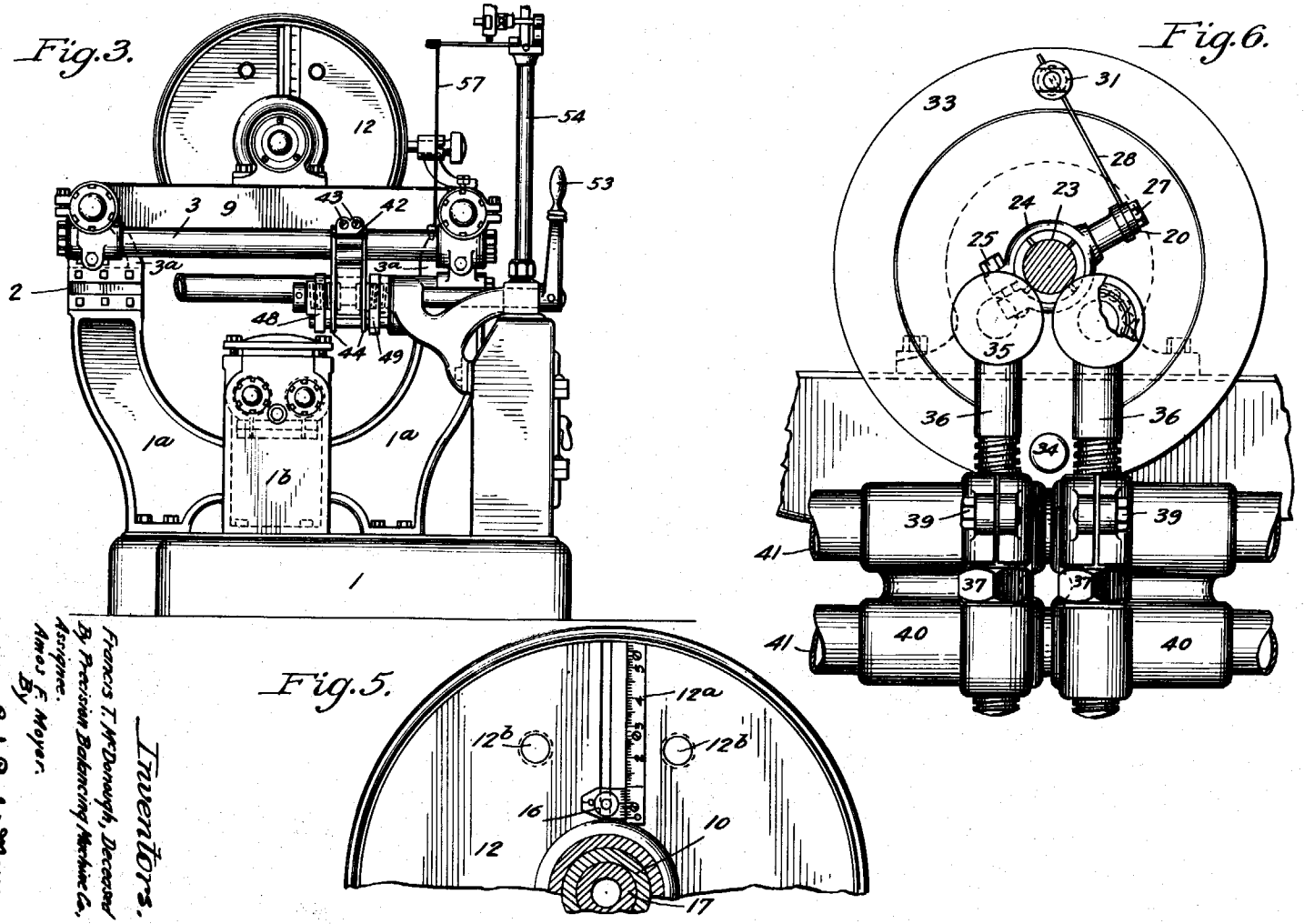
Inventors.
Francis T. McDonough, Deceased
By Precision Balancing Machine Co.,
Assignee.
Amos F. Moyer.
By
Paul Paul & Moore
Attorneys.

Jan. 7, 1936. A. F. MOYER ET AL Re. 19,812

BALANCING MACHINE

Original Filed May 2, 1924 4 Sheets-Sheet 4

Inventors:
Francis T. McDonough, Deceased.
By Precision Balancing Machine Co., Assignee.
Amos F. Moyer.
By
Paul Paul & Morgan
Attorneys.

Reissued Jan. 7, 1936

Re. 19,812

UNITED STATES PATENT OFFICE 19,812

BALANCING MACHINE

Amos F. Moyer, Minneapolis, Minn., and Francis T. McDonough, deceased, late of Madison, Wis., by Precision Balancing Machine Company, Eau Claire, Wis., assignee, by mesne assignments Original No. 1,812,353, dated June 30, 1931, Serial No. 710,595, May 2, 1924. Renewed October 21, 1927. Application for reissue February 5, 1932, Serial No. 590,999½

26 Claims. (Cl. 73—51)

The balancing machine of our invention and shown herewith is of a type adapted to make determination of unbalance to be corrected by application or removal of weight at determinate angular positions in each of two arbitrarily selected planes of the work, establishing thereby complete dynamic balance, including static balance. Disclosures are herein made which would be equally applicable to balancing machines in which static balance is established prior to determining dynamic unbalance. Likewise, the machine of our invention is of the type in which the revolving body is caused to rotate first at a speed higher than the critical speed of the resilient supporting means, and then permitted to revolve freely upon ball bearing supports while the rotative speed gradually diminishes from above to below the critical speed, thereby setting up a maximum amplitude of oscillation of the supporting means as critical speed is passed through, which maximum amplitude is a directly proportionate measure of the unbalance to be determined. Features are also disclosed which would be equally applicable to a machine of constant speed power driven type.

Among the novel features of this invention are: A resilient pivotal mounting of the supporting means which is adjustable as to the supporting strength of the resilient members in accordance with the weight of the work and the natural period or critical speed of oscillation, besides being frictionless in its oscillation save for the internal hysteresis of springs and for atmospheric resistance. A fly wheel and universally adjustable balance weight are carried by the supporting means, to which the work may be adjustably aligned, and which by its rotative inertia controls the rate at which the revolving work passes through the critical speed. Frictionless flexible means for connecting without constraint the work, with a source of driving power or flywheel control, including revolving parts through which quantities of counter-balance may be applied. These revolving parts are installed on the machine for the application and positioning of counter-balance equivalent to the correction determined for the work. Frictionless adjustable means for actuating an amplitude indicator from the oscillations of the supporting means are provided. A retaining lock and releasing device for locking the supporting means at the neutral position of rest and releasing same without jar or false disturbance when amplitudes of oscillation are to be observed.

In general arrangement the machine consists of a base on which is pivotally mounted a rectangular frame or supporting means capable of oscillation under spring restraint. At one end of said frame is a headstock carrying a ball bearing fly wheel and correction disk, while intervening between said headstock, and the pivotal support is a cross member with the two adjustable ball bearing rollers to support the adjacent end of the work. Beyond said pivots is a similar cross member with adjustable rollers to support the overhanging end of the work. All of these members, namely, the headstock and two cross supporting members, are longitudinally adjustable to permit bringing an arbitrarily selected transverse plane of the work into coincidence with the pivots, a procedure essential to direct measurement of the correction required in each of two arbitrarily selected planes of the work. A second transverse plane of the work may be brought into coincidence with the pivots either by longitudinal movement of the members on the frame or by interchanging the two ends of the work. In detail arrangement this machine represents only one of many possible constructions, and the specific reference to the relative location of parts is here given for reference purposes only, or to signify a preferred construction.

In the several views of the drawings like characters have been used to designate identical parts.

Figure 3 is an elevation taken from the left of Figure 1.

Figure 5 is a section and partial elevation taken on the line BB of Figure 4.

Figure 6 is an elevation and partial section taken on the line CC of Figure 4.

Figure 1:
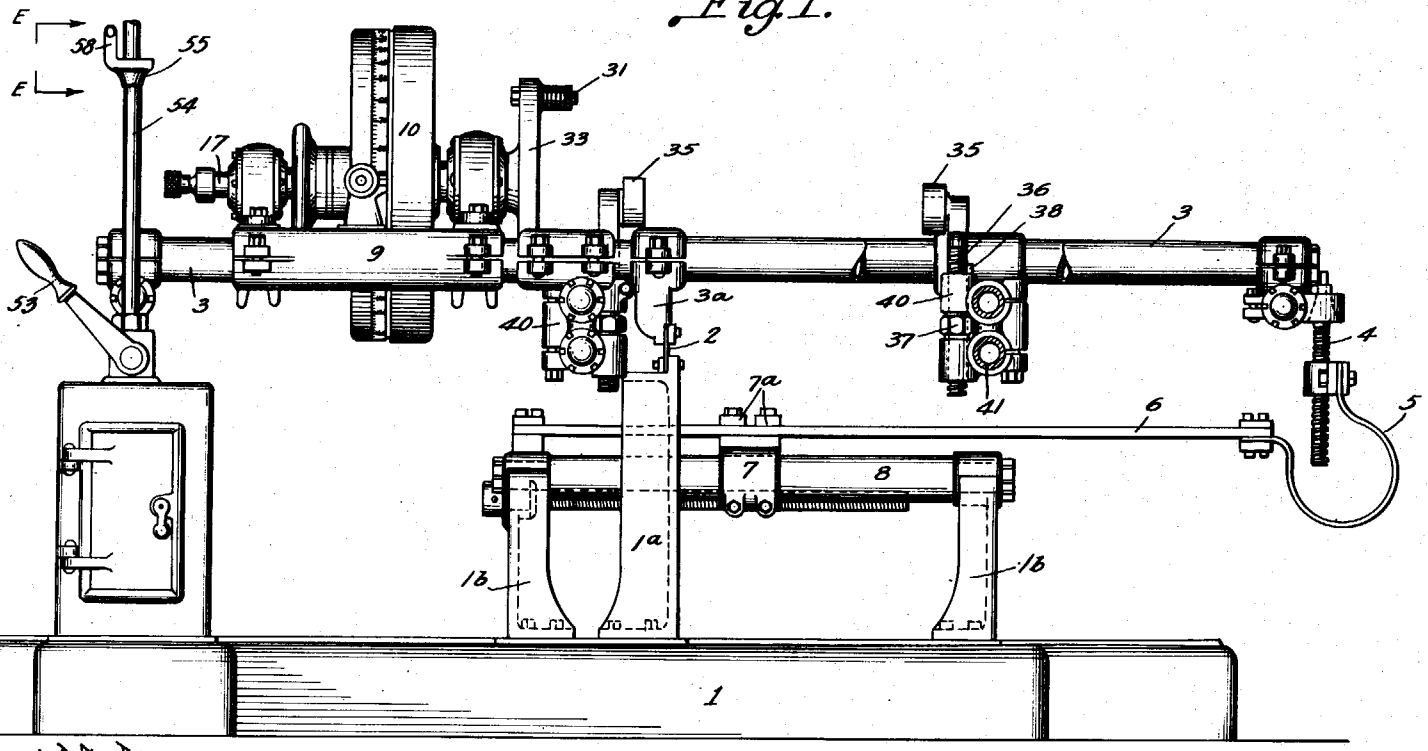
Figure 1 is a front elevation of the complete machine empty of work.

Referring to Figure 1, 1 is the base on which is the supporting member 1a. Clamped to the supporting member, 1a, in transverse alignment, are two plate spring pivots 2, to the upper edge of which are clamped supporting members 3a which carry the rectangular frame 3. The right extremity of frame 3 is adjustably connected by a screw 4 to a gooseneck spring 5 carried on the free end of a cantilever spring 6. The left end of the spring 6 is attached to the left supporting member 1b and at an intermediate point the spring 6 is secured by clamp blocks 7 and 7a to a slide 8, the free length of the spring 6 which lies to the right of the blocks 7 being adjustable by varying the longitudinal position of blocks 7 upon a slide 8. By means of this construction and arrangement the natural vibratory period, or critical speed, of frame 3 may be varied at will, since the shorter the free length of the spring 6, the more rapid will be the vibratory period of the frame 3, and the longer the free length of the spring 6 the more slow will be the vibratory period or critical speed. The adjustability of critical speed is of particular advantage when changing the set-up of the machine to a piece of work of different weight, for an increase in weight of the work overhanging the pivots will cause a slower critical speed, so that without this adjustment a different spring would be required for every setup, in order to arrive at the same critical speed. Also the required adjustment to increase a critical speed thus reduced by an addition of weight will be a shortening of the cantilever length of spring 6, which at the same time will increase the strength of the spring to support the additional weight. The machine is, therefore, adapted to a wide variety in the weight of work. Since the total support of frame 3 is effected through springs 2, 5 and 6, which have all joints securely clamped and no mechanically journalled connection, there is no frictional resistance to oscillation, other than atmospheric resistance, and internal hysteresis of the springs. The latter hysteresis of springs is smaller than the friction of any known mechanical pivot or journal, and the sensitiveness of the machine to small amounts of unbalance is accordingly very great, in view also of the light weight construction of the oscillating frame which is designed for necessary mechanical strength only, and not for rigid alignment of parts. The elimination of friction in the oscillation of the frame is essential in order that amplitudes of oscillation may be directly proportionate measures of amounts of unbalance.

Figure 4:
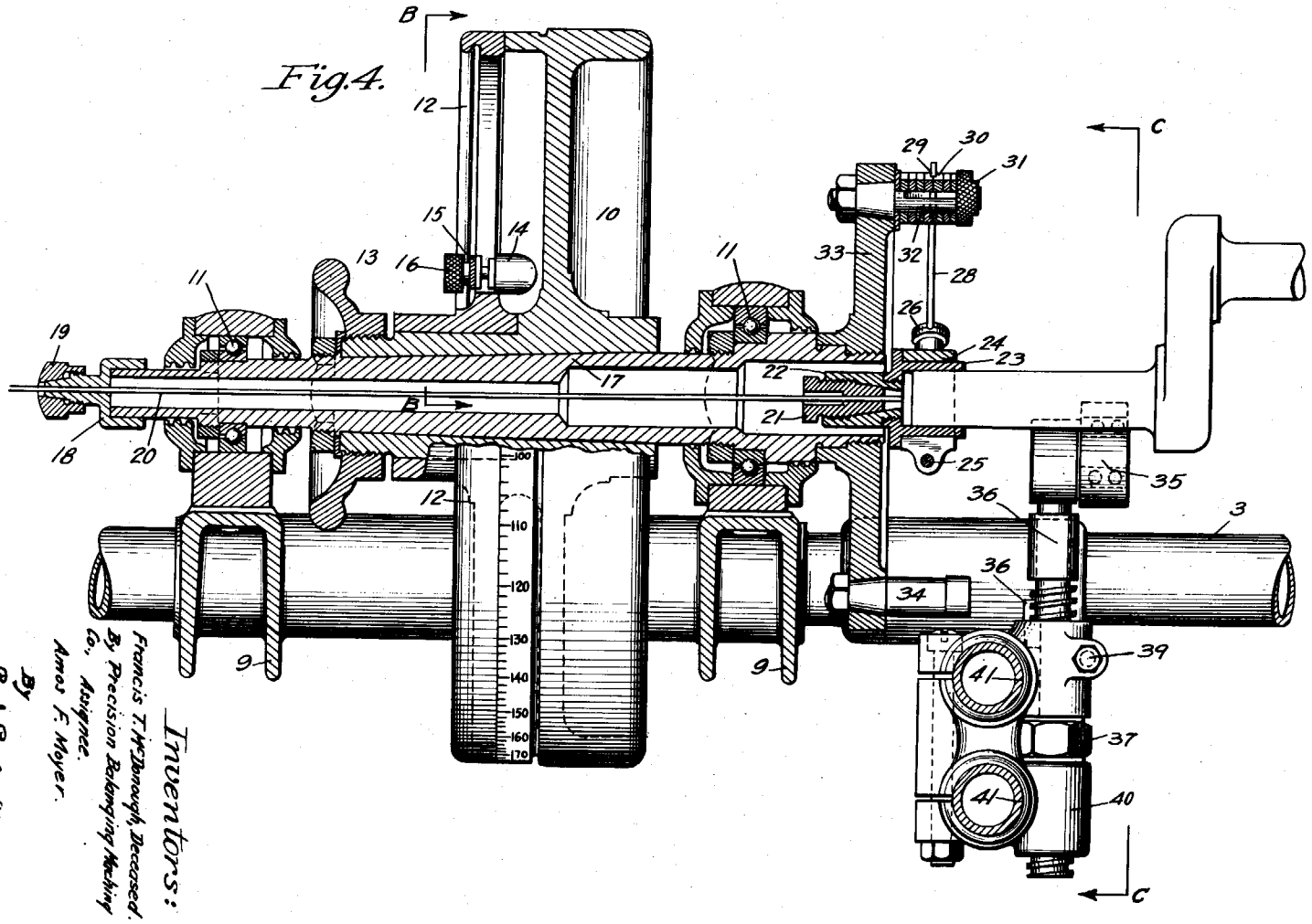
Figure 4 is a section taken on the line AA of Figure 2.

Longitudinally adjustable at the left end of the frame 3 is a headstock frame 9 which carries a flywheel 10 supported in ball bearing journals 11, shown in Figure 4. Rotatably mounted on the hub of flywheel 10 is a correction disk 12 which is locked against relative movement upon 10 by means of the threaded clamping wheel 13. The web of disk 12 is slotted radially to receive the adjustable weight 14, vernier, block 15 and clamping knob 16, the combined weight of which is carefully standardized so that movement of this assembly a known radial distance will correspond to a known quantity of unbalance. For example, a weight of ten ounces moved one inch represents a change in balance, or a quantity of unbalance equal to ten ounce-inches.

In Figure 5 are seen a clamping knob 16 and a vernier block 15, which is movable radially adjacent to graduated scale 12a. Block 15 carries graduations forming ten equal divisions having a total combined length equal to nine divisions on scale 12a, thus affording vernier readings of position within one-tenth of the smallest divisions on scale 12a. With the weight set at the inner position or zero reading, disk 12 is in perfect independent balance and can be turned to any angular position with respect to flywheel 10 without upsetting this condition. Flywheel 10, together with all other members mounted to revolve on journals 11 is also in perfect balance. Radial adjustment of weight assembly, 14, 15, 16 combined with angular adjustment of disk 12 permits the application of balance corrections of any desired magnitude or angular position. Should the magnitude of the desired correction be greater than permitted by the outer extremity of the adjusting slot, two threaded openings 12b are provided, in which may be inserted equal known weights permitting assembly 14, 15, 16 to be set back to zero, and thence proceeding by addition as with the rider on a scale beam after adding weights to the pan.

The periphery of flywheel 10 is graduated with angular divisions referring to an index point on the rim of the disk 12, so that any desired angular position for disk 12 may be readily set off.

For purposes of setting the revolving work into motion, as for example by hand or power friction applied to flywheel 10, and in order that the inertia of said flywheel may be transmitted to the work, said flywheel is rigidly mounted on tubular shaft 17 journaled in ball bearings 11 and connection is made to the work as follows. At the left end of the shaft 17 is a tapered soft collet 18 which by means of nut 19 engages the internal shaft 20, passing through the tubular shaft 17.

The right hand end of the shaft 20 is engaged by means of threaded collet 21 and hub 22 to a cup 23, the split sides of which engage the work by means of clamp collar 24, which is locked by screw 25. Shaft 20 is purposely made slender and of considerable length in order to be as flexible as possible, being preferably of spring material so as to permit slight flexure between the work and the headstock without restraint upon the bearings. In order to prevent torsional vibration between the work and the flywheel, which otherwise would occur through the elasticity of the shaft 20, a tangential driver 28 is engaged to clamp the collar 24 by means of a grooved washer 26 and a nut 27, and at the other end is engaged by means of beveled washers 29 and 30 and a nut 31 to pin 32 set in the face plate 33, which is in turn rigidly mounted on the shaft 17. The parts upon the pin 32 are counterbalanced by the pin 34, and a collar 24 is perfectly balanced with the driver 28 engaged. Driver 28 is also as slender and flexible as requirements will permit, and is preferably of spring material.

The work is carried upon four ball bearing rollers 35, each of which has independent vertical adjustment by means of a screw 36 and a nut 37, being guided by a key 38 and locked by clamp screws 39 to the supports 40, which are separately adjustable on cross members 41. The four screws 36 are adjusted to place the rotative axis of the work in alignment with the rotative axis of the shaft 17 when the frame 3 is at rest. Internal shaft 20 and a driver 28 are then engaged without strain so that the only forces acting upon the frame 3 are the forces of unbalance in the revolving bodies.

Figures 2, 7, 8:
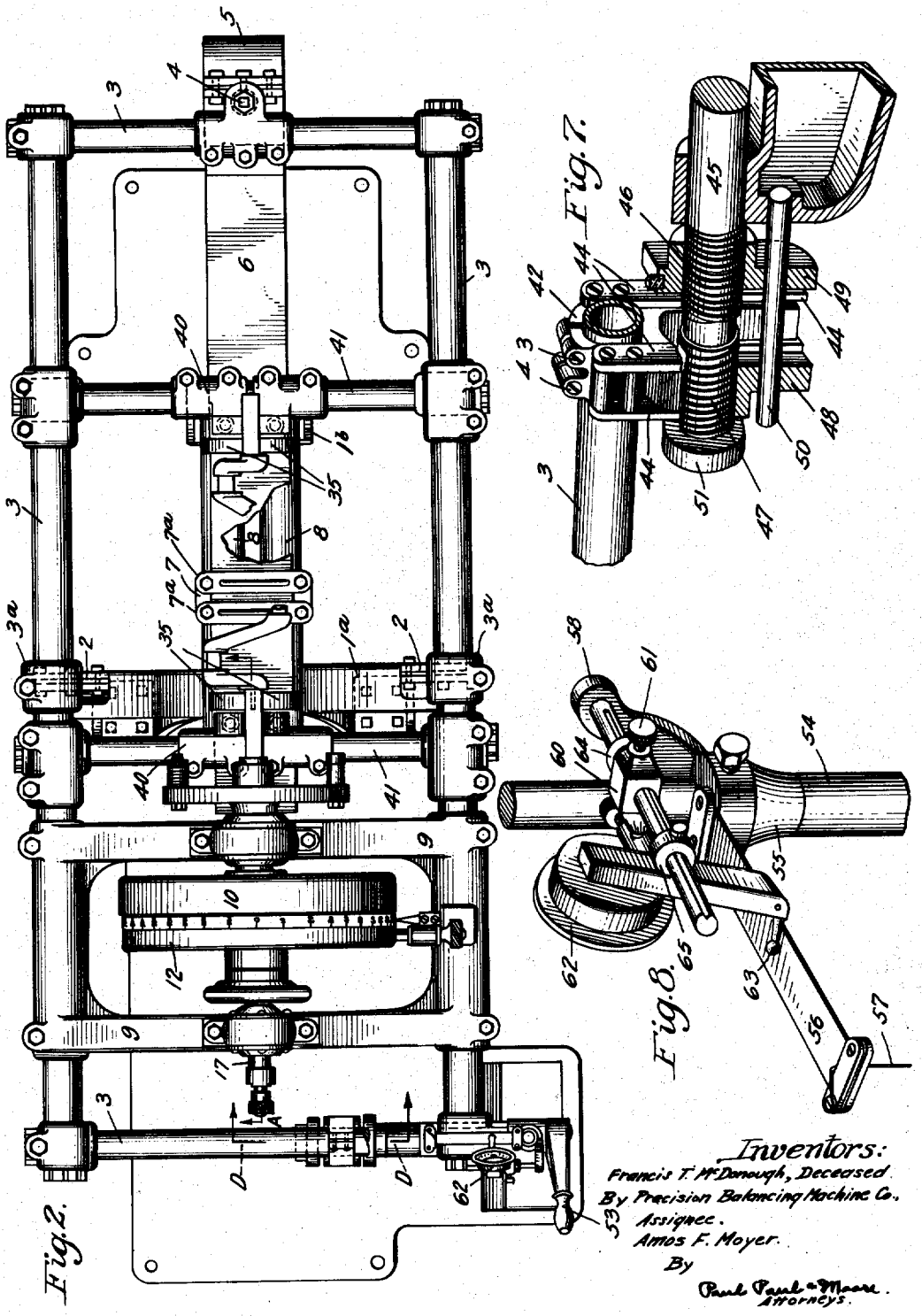
Figure 2 is a plan view of the complete machine showing a crankshaft in place as work to be balanced.
Figure 7 is a partial section shown in perspective taken on the line DD of Figure 2.
Figure 8 is a rear quarter perspective taken from position EE of Figure 1.

In order that the maximum amplitude of oscillations taken as critical speed is passed through may be a directly proportionate measure of the amount of unbalance, it is necessary that the frame 3 be locked against oscillation during the time that the revolving parts are set in motion at a speed above critical speed, and that the frame 3 be thereupon released from a truly neutral position of rest and permitted to act without interference or false jar under the disturbing forces of unbalance only. A gradually receding touch of the hand or finger will serve the purpose but mechanism means for effecting the result are shown in Figure 7. Upon the left cross member of the frame 3 is a forked member 42 adjustably locked in position by a clamp bolt or bolts 43. Upon the transverse faces of the depending forked portions of 42 are mounted four spring members 44 so attached to 42 at their upper ends that the lower ends diverge from a position of contact with said faces unless forced into contact by the application of a transverse pressure. Parallel with said member of the frame 3 and passing between the forked portions of 42 is a shaft 45 upon which are screw threads 46 and 47 respectively of right hand and left hand pitch. Engaging these threads respectively are threaded clamp jaws 48 and 49, which are slidably guided on a pin 50. A clockwise turning of shaft 45 will therefore cause the blocks 48 and 49 to move toward each other, while a counter clockwise turning of shaft 45 will cause a reversed movement.

In order that frame 3 may oscillate without friction jaws 48 and 49 must separate sufficiently to remain completely out of contact with springs 44, collar 51 being employed to limit excessive movement in this direction, and to guide the operator in obtaining the correct position of freedom. When there is no disturbing force acting upon the frame 3, any residual of vibratory oscillation may be readily damped out with this device by bringing jaws 48 and 49 into contact with springs 44 and gradually receding to a position of no contact. The gradually diminishing friction between the contacting surfaces will thus bring frame 3 to rest at the neutral position. In order that this process may be most effective, it is desirable that the contacting faces of springs 44 and jaws 48 and 49 be well smoothed and highly polished. Frame 3 is locked by bringing jaws 48 and 49 forcibly together to clamp members 44 and 42 as in a vise. Shaft 45 is actuated by a lever 53 seen in Figures 1, 2 and 3.

Proportionality of observed amplitudes of oscillation is of prime importance in the process employed on this machine, and since the obtaining of proportionality between such amplitudes and quantities of unbalance necessitates the absence or a very great reduction of frictional resistance to oscillation, an amplitude indicator is required which consumes the smallest possible energy in friction, and at the same time gives visual indications or readings of suitable proportionate size for numerical interpretation of the smallest quantities to be dealt with in practice. Likewise the largest amplitudes to be encountered must be within the range of observable readings on the indicator, and an adjustment of the indicator permitting a variation of the scale of the readings will be useful in that the movement of the indicator hand when observing large amplitudes of oscillation need not be so great in linear velocity as to render observations both difficult and inaccurate.

Figure 8 shows the mounting of an indicator of the type employed by machinists for observing the accuracy of metal parts; such an indicator, if possessing small frictional resistance, being adapted to the purpose because of the small necessary motion of the actuating parts and consequent small energy of friction. By the mounting here shown, the indicator is placed in a position convenient to careful observation by the operator, and is provided with an adjustment permitting variation of the scale of readings. 54 is a column supported on pedestal 1c of the base and carrying head 55. Clamped horizontally to 55 is a leaf spring 56 which when free is so upwardly curved that upon being drawn down by the wire 57 and attached to the frame 3 at its neutral position of rest, it has a position and contour when so restrained, which is substantially horizontal and straight. Vertical oscillation of the frame 3 will then be accompanied by a proportionate vertical movement of all portions of the free length of the spring 56, the magnitude of such movement being greatly diminished as the point considered approaches nearer the point of rigid attachment between the spring 56 and the head 55. Also carried by the head 55 on the column 54 is an arm 58 mounting a rod 59, upon which is slidably mounted a support 60 which may be locked in position by means of a thumb screw 61. The indicator 62 is mounted upon a support 60 with its actuating ball point 63 resting upon the spring 56 so that oscillation of the frame 3 and spring 56 are indicated by movement of the dial hand of indicator 62, which is at the obverse side as seen in Figure 8. By virtue of substantial parallelism between spring 56 and rod 59, the support 60 may so be moved along the rod 59 as to vary the proportionate oscillations of the ball 63 and hence to change the scale of movement shown by the dial hand of indicator 62. Adjustable stop collars 64 and 65 may be set at determined positions on rod 59 representing two locations of indicator 62 which may be found adapted to two varieties of work, or differing from each other by a predetermined ratio between the scales of movement observed at the indicator dial hand. For example, when support 60 is adjusted to the limiting position in contact with collar 64, the movement of the dial hand on indicator 62 for a given amplitude of oscillation of the frame 3 corresponding to a given amount of unbalance may be exactly one-tenth of the corresponding movement of the dial hand when support 60 is in contact with the collar 65. The latter position of indicator 62 is accordingly adapted to observing small quantities of unbalance, and the former to observing large quantities of unbalance, and the proportional relationship between quantities of unbalance and observed amplitudes may be readily retained numerically by proper positioning of the decimal point.

We claim as our invention:

1. In a balancing machine, a base, a support for the body to be balanced, resilient means on said base mounting said support for substantially pivotal vibration, said resilient mounting means being located in a correction plane of the body to be balanced, a resilient cantilever on said base, and flexible means connecting said cantilever to said support permitting relative movement therebetween.

2. In a balancing machine with a pivotally mounted support for the revolving test body, a flywheel journaled to revolve upon said support in substantial alignment with the test body, means adapted to revolve with said flywheel comprising a weight adjustable with respect to said flywheel both to known degrees of unbalance and to known angular positions, connecting means comprising a flexible member transmitting tangential forces to interconnect said flywheel and test body, and anti-friction bearings for said body and for said flywheel.

3. In a balancing machine, a base, a support connected to said base to oscillate and to revolvably carry, a test body, means to rotate the body, retaining means on said support, means mounted on said base for exerting pressure on said retaining means and for gradually releasing said pressure, and resilient frictional means interposed between said retaining means and pressure exerting means, whereby said support may be frictionally retained against oscillation, or said friction may be gradually reduced to permit said support to oscillate while said body is rotating.

4. In a balancing machine, an oscillatable support for a revolving test body, a graduated oscillation amplitude indicator, means including a frictionless element operatively connecting said indicator to said support, and means for adjusting a connection relative to said frictionless element operative to vary the ratio between the oscillatory movements of said support and the movements shown by said indicator.

5. In a balancing machine, an oscillatable support for a test body, a graduated oscillation amplitude indicator, means including a movable arm operatively connecting said indicator to said support, and means for varying the operative point of connection between said arm and said indicator effective to vary the ratio between the oscillatory movements of said support and the movements shown by said indicator.

6. In a balancing machine, the combination with an oscillatory support pivoted in one of the two transverse planes selected for balancing corrections of the revolving test body carried thereon with means for measuring amounts of unbalance by amplitudes of oscillation, of revolving means on said support separate from the test body adapted for applying a predetermined amount of unbalance at a predetermined position, thereby producing the same resultant effect on the oscillatory support as would the required balancing correction if applied in the other of the two transverse planes for balancing of the test body, whereby the system may revolve without oscillation of said support.

7. A balancing machine for revolving bodies comprising an oscillatable frame having ways parallel to the rotational axis of the body, a pivot controlling the frame to oscillate about an axis perpendicular to the rotational axis of the body, supports adjustable on said ways at opposite sides of the pivotal axis and adapted to carry a revolving test body with a selected transverse correction plane of the test body containing the pivotal axis; a head-stock also adjustable on said ways and carrying revolving parts coaxially with the test body and connected thereto, which are adapted for applying a determined amount of unbalance and for locating said unbalance at a determined angle with respect to the revolving test body.

8. In a balancing machine the combination with an oscillatory frame adapted to rotatably support a test body, said frame being pivotally restrained to oscillate transversely to the axis of the rotatable test body, of means revolving coaxially with the test body for applying and locating balancing corrections and disposed at the opposite side of the pivotal support from the selected plane of the test body for which a correction is being determined.

9. In a balancing machine, a base, a support for the body to be balanced, means on said base mounting said support for substantially pivotal vibration, a resilient cantilever on said base, flexible means connected to said cantilever, and adjustable means connecting said flexible means and said support.

10. In a balancing machine for revolving bodies, the combination with a bed, a support for the body to be balanced mounted to oscillate on the bed and provided with means by which said body may be carried while being free to revolve, means on said support arranged to be connected to the body to be operated, said means being adapted to have power applied thereto for revolving said body, means to lock said support against oscillation while said body is being revolved and to release said support after the body to be tested has been set in motion, thereafter permitting the body to revolve and the support to oscillate without mechanical interference.

11. A balancing machine having a support for a revolving test body, the said support being mounted to oscillate about a pivot, a spring means connected to the support in a manner to influence oscillations thereof, means for indicating the oscillatory positions of said support, and adjustable means connected to the spring means to cause said support to assume a desired neutral position when under static load, as registered by said indicating means.

12. In a balancing machine a work support adapted to oscillate, a cantilever spring having its free end connected to the work support in such manner that the natural vibratory period thereof may be varied by varying the effective length of the cantilever portion of the spring, the entire support and connection of the work support with the cantilever spring being effected by means whereby there is substantially no frictional resistance to oscillation, means arranged upon the work support for rotating work and means adjustably connecting the work support and spring.

13. A balancing machine for revolving bodies having the combination of a support for the body, mountings for said support permitting vibration substantially pivotal, a spring connected to the support and controlling the natural period of free vibration, locking means movable relatively to the support and permitting said support to be released or locked against vibration, and resilient friction members engageable with the movement of said locking means, whereby the locking means may be released, accompanied by gradual reduction of friction.

14. In a balancing machine, a base having a pivot member mounted thereon, a support revolubly carrying the body to be balanced and mounted for vibration about the axis of said pivot, flexible means connected to said support and spaced from said pivot, a resilient cantilever operatively connected to said flexible means for controlling vibration of said support, and means for adjusting the stiffness of said cantilever for regulating the natural frequency of vibration of said support.

15. In a balancing machine with a support for the revolving body, clamping means having surfaces parallel to the natural direction of vibration of the support, a retaining member secured to the support, means to exert or release a pressure between said clamping surfaces and retaining member, and resilient means interposed therebetween, whereby the frictional damping to vibration may be gradually diminished as said clamping means are released.

16. In a balancing machine with an oscillatory support for the revolving body, clamping means having surfaces parallel to the natural direction of oscillation of said support, resilient means secured to said support and extending between said clamping surfaces, and means to exert or release a pressure between said clamping surfaces and resilient means, whereby the frictional damping to vibration may be gradually diminished as said clamping means are released.

17. In a balancing machine having a resiliently mounted frame adapted to support a rotating body in a plurality of bearings, a spring comprising a portion of said resilient mounting, means for adjusting said spring as to the characteristic ratio of force increment to deflection increment between a point of fixed support and the point of attachment of said spring to the said supporting means, operating means comprising a shaft mounted on said frame to revolve in substantial alignment with the rotating body, and flexible means transmitting tangential forces between said shaft and body to revolve synchronously.

18. In a machine for balancing revolving bodies upon a vibratable frame, a flexible shaft connected to the revolving body in substantial axial alignment therewith, a hollow shaft journaled on said frame, said hollow shaft surrounding said flexible shaft and being connected thereto near the opposite end from said body, and means adjustable with respect to balance carried on said hollow shaft.

19. In a machine for balancing revolving bodies upon a frame which oscillates about a reference center contained in a transverse plane intersecting the revolving body near one end thereof, a flexible shaft connected to said end of the body in substantial axial alignment therewith, a hollow shaft journaled on said frame, said hollow shaft surrounding said flexible shaft and being connected thereto near the opposite end from said body, and means adjustable with respect to balance carried on said hollow shaft.

20. In a balancing machine, the combination with a support mounted to oscillate about a pivot in one of two transverse planes selected for balancing corrections on the revolving test body carried thereon, of revolving means on said support and flexibly connected to the test body for applying a determinate amount of unbalance at a determinate position, thereby to produce the same resultant effect on the oscillation of said support as would be produced by the required balancing correction if applied in the other of the two transverse planes selected for balancing the revolving test body.

21. In a machine for balancing revolving bodies having a support mounted to oscillate about a pivot contained in a transverse plane intersecting the body, a flexible shaft connected coaxially to the body, a hollow shaft journaled on said support and enclosing said flexible shaft and connected thereto near the opposite end from the body, and means mounted on said hollow shaft for applying and locating balancing corrections for offsetting the unbalance to be corrected in a transverse plane of the body disposed at the opposite side of said pivot.

22. In a balancing machine, a base having a pivot fixed thereon, a frame mounted to oscillate about said pivot, supports on said frame upon opposite sides of said pivot for carrying a rotatable test body, and means to adjust said supports and test body with respect to said pivot in a direction parallel to the rotational axis of said test body, whereby an arbitrarily selected correction plane may be made to contain said pivot.

23. In a balancing machine, a frame for rotatably supporting a test body and mounted for vibration about a reference center contained in a plane transversely intersecting the test body and intended to receive a balancing correction, a headstock with a revoluble shaft having means for applying balancing corrections and mounted on said frame co-axially with the test body, and flexible means for applying tangential forces between said shaft and test body whereby said body may be revolved by said shaft.

24. In a balancing machine, a frame for rotatably supporting a test body and mounted for vibration about a pivot, a headstock with a revoluble shaft having means for applying balancing correction and mounted on said frame coaxially with the test body, and flexible means for applying tangential forces between said shaft and said test body whereby said body may be revolved by said shaft.

25. In a balancing machine, a frame adapted to oscillate about a pivot, supports on said frame upon opposite sides of said pivot for carrying a rotatable test body with a selected transverse correction plane of the body containing said pivot, and a headstock carried by said frame and comprising revoluble means for applying unbalance of any desired amount and angular position, said headstock and one of said supports being adjustable on said frame with respect to said pivot in a direction parallel to the axis of rotation of the test body.

26. In a balancing machine, an oscillatable support, a test body mounted for rotation on said support, means adapted intermittently to revolve freely or to have power applied thereto for rotating said test body, pressure means for applying friction to said support to prevent oscillation while said power is being applied, and means for gradually decreasing the friction produced by said pressure means on said support to permit said support to oscillate.

AMOS F. MOYER.
PRECISION BALANCING MACHINE COMPANY, *Assignee of Francis T. McDonough, Deceased,*
By WILLIAM C. TUFTS,
*President.*